United States Patent
Hamagishi

(10) Patent No.: US 7,609,445 B2
(45) Date of Patent: Oct. 27, 2009

(54) IMAGE DISPLAY

(75) Inventor: Goro Hamagishi, Toyonaka (JP)

(73) Assignee: Sanyo Epson Imaging Devices Corp., Tokyo (JP)

( * ) Notice: Subject to any disclaimer, the term of this patent is extended or adjusted under 35 U.S.C. 154(b) by 259 days.

(21) Appl. No.: 11/353,071

(22) Filed: Feb. 14, 2006

(65) Prior Publication Data

US 2006/0209371 A1 Sep. 21, 2006

(30) Foreign Application Priority Data

Mar. 17, 2005 (JP) .............................. 2005-076195

(51) Int. Cl.
G02B 27/22 (2006.01)
(52) U.S. Cl. ........................................ 359/463; 348/59
(58) Field of Classification Search ................. 359/463; 348/59
See application file for complete search history.

(56) References Cited

U.S. PATENT DOCUMENTS

| | | | |
|---|---|---|---|
| 5,132,839 A | | 7/1992 | Travis |
| 5,969,850 A | * | 10/1999 | Harrold et al. .............. 359/320 |
| 6,137,456 A | | 10/2000 | Bhagavatula et al. |
| 6,160,527 A | * | 12/2000 | Morishima et al. ............. 345/7 |
| 2003/0107805 A1 | * | 6/2003 | Street ......................... 359/464 |

FOREIGN PATENT DOCUMENTS

| | | |
|---|---|---|
| EP | 0 935 154 A | 8/1999 |
| EP | 1 515 178 A | 3/2005 |
| JP | 7-181429 A | 7/1995 |
| JP | 10-161061 A | 6/1998 |
| JP | 10-206795 | 8/1998 |
| WO | WO 2005/027534 A | 3/2005 |

OTHER PUBLICATIONS

Toyooka, K. et al.: "13.2: The 3D Display Using Field-Sequential LCD with Light Direction Controlling Back-Light," SID 01 Digest, vol. XXXII, 2001, pp. 174-177.
European Search Report for Corresponding European Patent Application No. EP 06 250 802, dispatched May 11, 2006.

* cited by examiner

Primary Examiner—Lee Fineman
(74) Attorney, Agent, or Firm—McDermott Will & Emery LLP

(57) ABSTRACT

An image display including light emission controller provided with a transmissive portion and a shielding portion extending in a second direction intersecting with a first direction connecting the left and right eyes of an observer with each other for transmitting and blocking light irradiated from a light source respectively and capable of changing the length of the transmissive portion and the shielding portion in the first direction and a lens including at least one lens portion formed to advance the light received from the light source through the transmissive portion of the light emission controller in a prescribed direction and to extend in the second direction.

10 Claims, 9 Drawing Sheets

IMAGE DISPLAY

BACKGROUND OF THE INVENTION

1. Field of the Invention

The present invention relates to an image display, and more particularly, it relates to an image display providing stereoscopic images etc. to observers.

2. Cross-Reference to Related Applications

The priority application No. JP2005-76195 upon which this patent application is based is hereby incorporated by reference.

3. Description of the Background Art

For example, Japanese Patent Laying-Open No. 10-161061 (1998) discloses a stereoscopic image display displaying three-dimensional stereoscopic images.

As shown in FIG. 18, the stereoscopic image display 500 disclosed in Japanese Patent Laying-Open No. 10-161061 comprises a backlight 501, a liquid crystal panel 502, arranged on a light emission side of the backlight 501, having shielding portions 502a and translucent portions 502b, polarizing plates 503 and 504 opposed to each other to hold the liquid crystal panel 502 therebetween, a lenticular lens 505, provided separately from the liquid crystal panel 502, arranged on a light emission side of the polarizing plate 504 and an image display liquid crystal panel 506 arranged on a light emission side of the lenticular lens 505 for displaying images. The liquid crystal panel 502 is provided with a plurality of vertically striped transparent conductive films formed on a transparent substrate. The shielding portions 502a and the translucent portions 502b of the aforementioned liquid crystal panel 502 are provided in correspondence to the transparent conductive films. In other words, the shielding portions 502a and the translucent portions 502b are provided in one-to-one correspondence to the vertically striped transparent conductive films of the liquid crystal panel 502 respectively in the stereoscopic image display 500 disclosed in Japanese Patent Laying-Open No. 10-161061. The lenticular lens 505 condenses light irradiated from the backlight 501 and transmitted through the translucent portions 502b provided in correspondence to the transparent conductive films on a light arrival area 520 having a length X in a direction A shown in FIG. 18 on a position where an observer 510 is located.

The stereoscopic image display 500 disclosed in Japanese Patent Laying-Open No. 10-161061 alternately displays left- and right-eye images on the image display liquid crystal panel 506 and switches the shielding portions 502a and the translucent portions 502b of the liquid crystal panel 502 by controlling application of voltage to the transparent conductive films in synchronization with the switching of the display. Thus, the stereoscopic image display 500 guides only the right-eye images to the right eye 510a of the observer 510 while the image display liquid crystal panel 506 displays the right-eye images, and guides only the left-eye images to the left eye 510b of the observer 510 while the image display liquid crystal panel 506 displays the left-eye images. The stereoscopic image display 500 repeats this switching operation, so that the observer 510 can observe stereoscopic images.

In the stereoscopic image display 500 disclosed in Japanese Patent Laying-Open No. 10-161061 having the shielding portions 502a and the translucent portions 502b of the liquid crystal panel 502 in one-to-one correspondence to the transparent conductive films provided on the transparent substrate of the liquid crystal panel 502, however, it is difficult to arbitrary change the length of the shielding portions 502a and the translucent portions 502b in the direction A shown in FIG. 18. Thus, it is difficult to subdivide or enlarge sets of the shielding portions 502a and the translucent portions 502b of the same liquid crystal panel 502, and hence it is disadvantageously difficult to reduce or increase the length X of the light arrival area 520 formed by the light passing through the translucent portions 502b of the same liquid crystal panel 502 in the direction A. Therefore, it is disadvantageously difficult to provide stereoscopic images to a plurality of observers by reducing the length X of the light arrival area 520 in the direction A shown in FIG. 18 thereby individually introducing light into the left and right eyes of the plurality of observers or to provide different planar images (two-dimensional images) to a plurality of observers located on different observational positions respectively by increasing the length X of the light arrival area 520 in the direction A shown in FIG. 18 through the same liquid crystal panel (light emission control means) 502.

SUMMARY OF THE INVENTION

The present invention has been proposed in order to solve the aforementioned problems, and an object of the present invention is to provide an image display capable of providing different planar images (two-dimensional images) to observers located on different observational positions respectively and providing stereoscopic images to a plurality of observers through the same light emission control means.

In order to attain the aforementioned object, an image display according to an aspect of the present invention comprises a display panel for displaying images, a light source for irradiating light toward the display panel, light emission control means arranged between the light source and the display panel, provided with a transmissive portion and a shielding portion extending in a second direction intersecting with a first direction connecting the left and right eyes of an observer with each other for transmitting and blocking the light irradiated from the light source respectively and capable of changing the length of the transmissive portion and the shielding portion in the first direction and a lens including at least one lens portion formed to advance the light received from the light source through the transmissive portion of the light emission control means in a prescribed direction and to extend in the second direction, and the light emission control means has at least either a function of providing different images to observers located on different observational positions respectively or a function of providing stereoscopic images to a plurality of observers by changing the length of the transmissive portion and the shielding portion of the light emission control means in the first direction thereby controlling an arrival position of the light received from the light source through the transmissive portion of the light emission control means.

The image display according to this aspect can change the length of arrival areas of light condensed on the positions of the observers in the first direction by changing the length of the transmissive portion and the shielding portion of the light emission control means in the first direction as hereinabove described. Therefore, the image display can reduce the length of the arrival areas of the light condensed on the positions of the observers and subdivide the arrival areas by reducing the length of the transmissive portion and the shielding portion of the light emission control means in the first direction and subdividing a set of the transmissive portion and the shielding portion. When there are a plurality of observers, therefore, the image display can condense the light received from the light source in the vicinity of the eyes of the plurality of observers respectively. Consequently, the image display can provide stereoscopic images to the plurality of observers by adding images having binocular parallax to the light incident upon the left and right eyes of the plurality of observers respectively. Further, the image display can increase the length of the arrival areas of the light condensed on the positions of the observers in the first direction through the same light emission control means by increasing the length of the transmissive portion and the shielding portion of the light emission control means in the first direction. When there are a plurality of observers located on different observational positions respectively, therefore, the image display can condense the light received from the light source in the vicinity of both eyes of the observers respectively through the same light emission control means. Consequently, the image display can provide different planar images (two-dimensional images) to the plurality of observers located on different observational positions respectively by adding different images to light advancing toward the observers located on different observational positions respectively. Thus, the image display according to this aspect can provide stereoscopic images to a plurality of observers and provide different planar images (two-dimensional images) to observers located on different observational positions respectively through the same light emission control means.

In the image display according to the aforementioned aspect, the light emission control means is preferably constituted to be able to switch the transmissive portion and the shielding portion. According to this structure, the image display can easily provide the stereoscopic images to the observers by switching right-eye images and left-eye images displayed on the display panel at the timing for switching the transmissive portion and the shielding portion. Further, the image display can easily provide the different planar images to the observers located on the different observational positions respectively by switching the planar images displayed on the display panel at the timing for switching the transmissive portion and the shielding portion.

In the image display according to the aforementioned aspect, the lens preferably includes a lenticular lens having a substantially semicylindrical lens portion provided in correspondence to a set of the transmissive portion and the shielding portion to extend in the second direction. According to this structure, the image display can advance light received through the transmissive portion of the light emission control means toward the prescribed direction through the lens portion of the lenticular lens.

The image display comprising the aforementioned lenticular lens preferably provides the different images to the observers located on the different observational positions respectively by associating one lens portion of the lenticular lens with the set of the transmissive portion and the shielding portion of the light emission control means thereby condensing light on regions where the different observers are located. According to this structure, the image display can easily provide the different images to the observers located on the different observational positions respectively by adding different images to the light condensed on the regions where the respective observers are located.

The image display comprising the aforementioned lenticular lens preferably provides the stereoscopic images to the plurality of observers by associating one lens portion of the lenticular lens with a plurality of sets of the transmissive portions and the shielding portions of the light emission control means thereby condensing light on the respective portions of the right and left eyes of the observers. According to this structure, the image display can easily provide the stereoscopic images to the plurality of observers by adding right- and left-eye images to the light condensed on the portions of the right and left eyes of the observers respectively.

In the image display according to the aforementioned aspect, the light emission control means preferably includes a light emission control liquid crystal panel provided with a transmissive area and a shielding area extending in the second direction alternately in the first direction for transmitting and blocking the light irradiated from the light source respectively as well as a first polarizing plate and a second polarizing plate opposed to each other through the light emission control liquid crystal panel. According to this structure, the image display can emit light passing through liquid crystals located on the transmissive area of the light emission control liquid crystal panel. The image display can further block light passing through liquid crystals located on the shielding area of the light emission control liquid crystal panel.

In this case, the light emission control liquid crystal panel is preferably constituted to be able to switch the transmissive area and the shielding area. According to this structure, the image display can easily provide the stereoscopic images to the observers by switching right-eye images and left-eye images displayed on the display panel at the timing for switching the transmissive area and the shielding area. Further, the image display can easily provide the different planar images to the observers located on the different observational positions respectively by switching the planar images displayed on the display panel at the timing for switching the transmissive area and the shielding area.

In the image display comprising the aforementioned light emission control liquid crystal panel, the light emission control liquid crystal panel is preferably provided with a plurality of electrodes for controlling the transmissive area and the shielding area of the light emission control liquid crystal panel adjacently in the first direction, and the light emission control liquid crystal panel preferably changes the length of the transmissive area and the shielding area in the first direction by controlling driving of the plurality of electrodes of the light emission control liquid crystal panel. According to this structure, the image display can easily change the length of the transmissive area and the shielding area in the first direction by reducing or increasing the numbers of electrodes constituting the transmissive area and the shielding area respectively by controlling application states of voltage on the electrodes when constituting each of the transmissive area and the shielding area of a plurality of electrodes. Thus, the image display can easily change the length of a light arrival area where the light irradiated from the light source is condensed in the first direction through the single light emission control liquid crystal panel. Consequently, the image display can provide different planar images (two-dimensional images) to the plurality of observers located on the different observational positions respectively and provide the stereoscopic images to the plurality of observers through the single light emission control liquid crystal panel.

In the aforementioned structure having the light emission control liquid crystal panel provided with the electrodes, the plurality of electrodes of the light emission control liquid crystal panel preferably extend along the second direction respectively. According to this structure, the image display can be easily provided with the transmissive portion and the shielding portion for transmitting and blocking the light respectively to extend along the second direction. Thus, the image display can easily advance the light received from the light source in the prescribed direction through the lens portion provided to extend in the second direction.

In the aforementioned structure having the light emission control liquid crystal panel provided with the electrodes, the light emission control liquid crystal panel may limit regions observable by the observers by controlling driving of the plurality of electrodes of the light emission control liquid crystal panel thereby controlling the length of the transmissive area in the first direction. According to this structure, the image display, capable of controlling the length of a light arrival area where light received through the transmissive area of the light emission control liquid crystal panel is condensed in the first direction, can reduce areas where the observers can observe images displayed on the display panel. Thus, the image display, capable of limiting the view angle of the observers observing the images displayed on the display panel, can inhibit other observers from observing the images of the display panel observed by these observers.

In this case, the light emission control liquid crystal panel is preferably constituted to be able to switch the transmissive area and the shielding area. According to this structure, the image display, capable of switching the light arrival area where light received through the transmissive area of the light emission control liquid crystal panel is condensed and a light unarrival area where no light received through the transmissive area of the light emission control liquid crystal panel is condensed, can easily switch an area where the view angle is limited and the other area.

The image display according to the aforementioned aspect preferably switches the transmissive portion and the shielding portion of the light emission control means every 1/n frame period (n: natural number of at least two) of the display panel, and preferably controls the display panel to switch a first image and a second image displayed on the display panel in synchronization with switching between the transmission portion and the shielding portion of the light emission control means. According to this structure, the image display can introduce first images (e.g., right-eye images) displayed on the display panel into the right eyes of the observers while guiding no light from the light source to the left eyes of the observers in the 1/n frame period. In a subsequent 1/n frame period, the image display can introduce second images (e.g., left-eye images) displayed on the display panel into the left eyes of the observers while guiding no light from the light source to the right eyes of the observers. Thus, the observers can observe the first and second images (right- and left-eye images) with the right and left eyes respectively in one frame period. Consequently, the observers, recognizing that they simultaneously observe the first and second images (right- and left-eye images) displayed on the display panel with the right and left eyes respectively, can observe stereoscopic images having small image deterioration. Further, the image display can introduce first images (e.g., both-eye planar images) displayed on the display panel into both eyes of a first observer while guiding no light from the light source to the eyes of a second observer in the 1/n frame period. In the subsequent 1/n frame period, the image display can introduce second images (e.g., both-eye planar images) into both eyes of the second observer while guiding no light from the light source to the eyes of the first observer. Thus, the first and second observers can observe the first and second images (planar images) at least in one frame period. Consequently, the first and second observers simultaneously recognize that they continuously observe the first and second images displayed on the display panel respectively, whereby the image display can provide different planar images (two-dimensional images) having small image deterioration to the first and second observers respectively.

In this case, the 1/n frame period is preferably a ½ frame period. According to this structure, the image display can provide first images (e.g., right-eye images) and second images (e.g., left-eye images) displayed on the display panel to the right and left eyes of the observers respectively in one frame period. Further, the image display can provide first images (both-eye planar images) and second images (both-eye planar images) displayed on the display panel to the first and second observers respectively in one frame period.

In the image display according to the aforementioned aspect, the light emission control means preferably includes a light emission control liquid crystal panel provided with a transmissive area and a shielding area extending in the second direction alternately in the first direction for transmitting and blocking the light irradiated from the light source respectively, and the light emission control liquid crystal panel is preferably integrated with the lens. According to this structure, the number of components can be reduced as compared with a case of providing the lens and the light emission control liquid crystal panel independently of each other.

In the aforementioned structure having the lens and the light emission control liquid crystal panel integrated with each other, the image display preferably further comprises a third polarizing plate and a fourth polarizing plate opposed to each other through the lens and the light emission control liquid crystal panel integrated with each other. According to this structure, the image display can easily transmit and block light advanced to the prescribed direction through the lens after passing through the third polarizing plate as well as the shielding area and the transmissive area of the light emission control liquid crystal panel with the fourth polarizing plate.

In the image display according to the aforementioned aspect, the display panel is preferably integrated with the lens. According to this structure, the number of components can be reduced as compared with a case of providing the lens and the display panel independently of each other.

In the image display according to the aforementioned aspect, the light emission control means preferably includes a light emission control liquid crystal panel provided with a transmissive area and a shielding area extending in the second direction alternately in the first direction for transmitting and blocking the light irradiated from the light source respectively, and the image display preferably further comprises position sensing means for sensing the positions of the observers and a control portion for moving the transmissive area and the shielding area of the light emission control liquid crystal panel in response to the positions of the observers sensed by the position sensing means. According to this structure, the image display, capable of sensing movement of the observers with the position sensing means and moving the transmissive area and the shielding area of the light emission control liquid crystal panel on the basis of positional information thereof, can provide proper images to the observers also when the observers move.

In the image display according to the aforementioned aspect, the lens portion of the lens formed to extend in the second direction is preferably provided in a state inclined by a prescribed angle with respect to a pixel train of the display panel extending in a direction substantially perpendicular to the first direction. According to this structure, the longitudinal direction of the lens portion and the direction of pixel arrangement of the display panel are inconsistent with each other, whereby the image display can inhibit the pixels of the display panel from re-interfering with light irradiated from the light source and incident upon the display panel with bright and dark stripes due to interference resulting from transmission through the lens portion provided on the lens. Consequently, the image display can suppress formation of interference fringes (moiré) on the display panel.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

The structure of an image display 1 according to a first embodiment of the present invention is described with reference to FIGS. 1 to 4.

Figure 1:
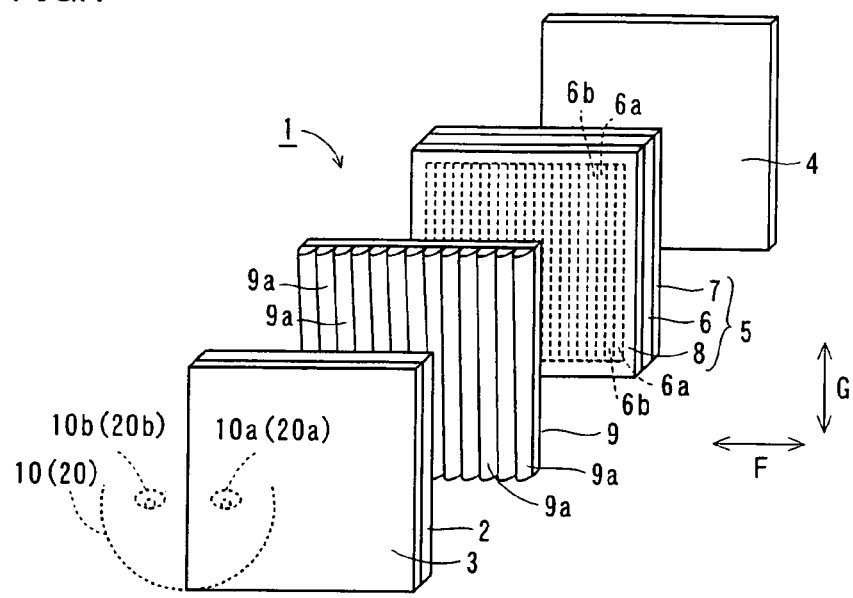
FIG. 1 is an exploded perspective view showing an image display according to a first embodiment of the present invention.
Figure 2:
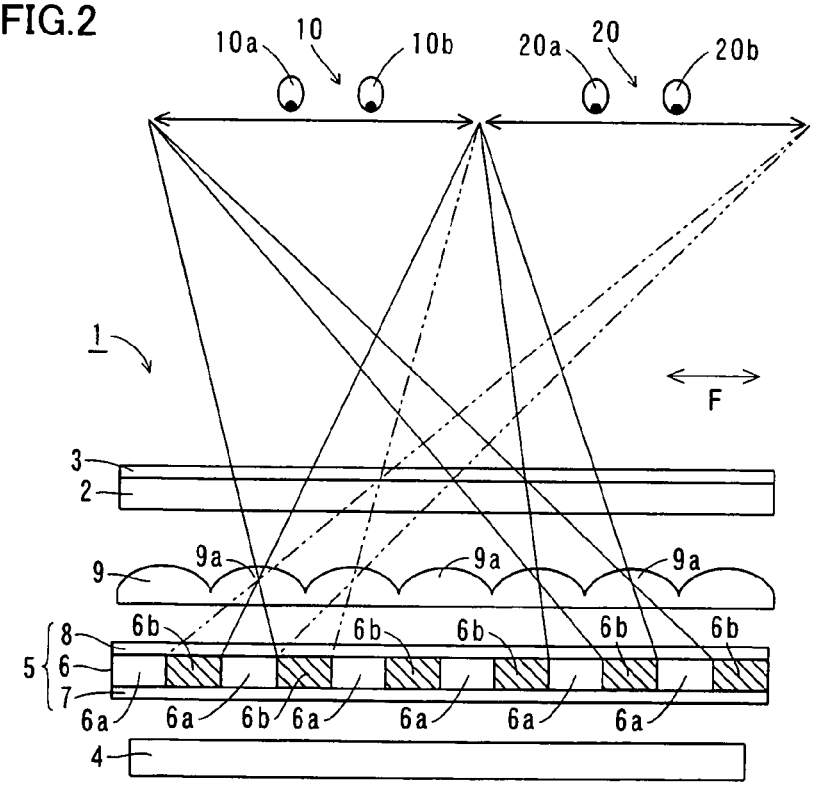
FIG. 2 is a diagram showing a display panel observed by observers from above in the image display according to the first embodiment of the present invention shown in FIG. 1.

As shown in FIGS. 1 and 2, the image display 1 according to the first embodiment of the present invention comprises a display panel 2 for displaying images, a polarizing plate 3 mounted on a side of the display panel 2 closer to observers 10 and 20 and a backlight 4 for irradiating light toward the display panel 2.

According to the first embodiment, a light emission control liquid crystal unit 5 is arranged on a side of the backlight 4 closer to the observers 10 and 20. The light emission control liquid crystal unit 5 is an example of the "light emission control means" in the present invention. As shown in FIG. 2, this light emission control liquid crystal unit 5 includes a light emission control liquid crystal panel 6 having transmissive areas 6a and shielding areas 6b for transmitting and blocking the light irradiated from the backlight 4 respectively and polarizing plates 7 and 8 opposed to each other through the light emission control liquid crystal panel 6. The polarizing plates 7 and 8 are examples of the "first polarizing plate" and the "second polarizing plate" in the present invention respectively. The polarizing plates 7 and 8 opposed to each other through the light emission control liquid crystal panel 6 have polarization axes perpendicular to each other. The polarizing plate 7 has a function of transmitting light having a first polarization axis and absorbing light having a second polarization axis substantially perpendicular to the first polarization axis. The polarizing plate 8 has a function of transmitting light having the second polarization axis substantially perpendicular to the first polarization axis and absorbing light having the first polarization axis. The backlight 4 is an example of the "light source" in the present invention.

Figure 4:
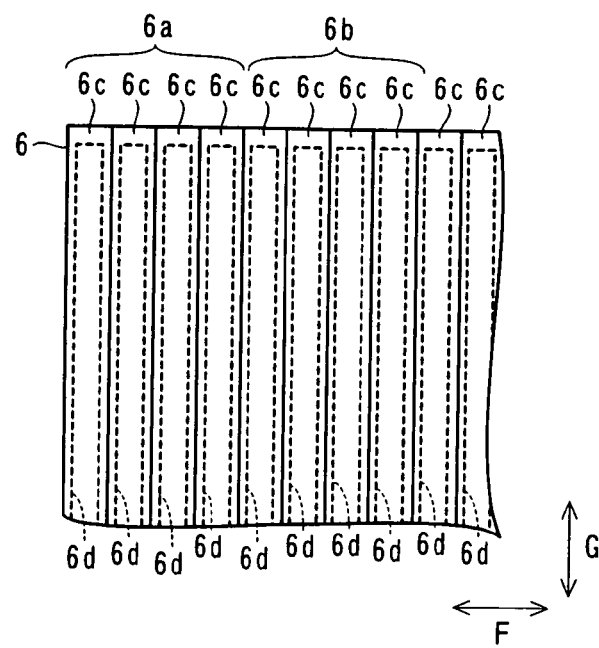
FIG. 4 is a partially enlarged view of a light emission control liquid crystal panel of the image display according to the first embodiment of the present invention shown in FIG. 1.

According to the first embodiment, the transmissive areas 6a and the shielding areas 6b of the light emission control liquid crystal panel 6 extend in a direction (G in FIG. 1) substantially perpendicular to a direction (F in FIG. 1) connecting right and left eyes 10a and 10b (20a and 20b) of the observer 10 (20) with each other alternately in the direction F. Each of the transmissive areas 6a and the shielding areas 6b is constituted of a plurality of (e.g., four) unit areas 6c (see FIG. 4) of the light emission control liquid crystal panel 6, as shown in FIG. 4. A plurality of electrodes 6d are provided on the unit areas 6c constituting the transmissive areas 6a and the shielding areas 6b of the light emission control liquid crystal panel 6 adjacently in the direction F shown in FIG. 4. In a two-screen display mode described later, the image display 1 applies no voltage to the four electrodes 6d corresponding to the four unit areas 6c constituting each transmissive area 6a while applying voltage to the four electrodes 6d corresponding to the four unit areas 6c constituting each shielding area 6b. In other words, regions having the electrodes 6d subjected to no voltage application form the transmissive areas 6a transmitting the light irradiated from the backlight 4 while those having the electrodes 6d subjected to voltage application form the shielding areas 6b blocking the light irradiated from the backlight 4 in the image display 1 according to the first embodiment.

The light emission control liquid crystal panel 6 is filled with liquid crystals (not shown). The image display 1 keeps the liquid crystal molecules twisted by 90° when applying no voltage to the electrodes 6d of the light emission control liquid crystal panel 6. When applying voltage to the electrodes 6d of the light emission control liquid crystal panel 6, on the other hand, the image display 1 cancels the twisting of the liquid crystal molecules. According to the first embodiment, the image display 1 provided with the light emission control liquid crystal panel 6 of the aforementioned structure between the backlight 4 and the display panel 2 cancels twisting of the liquid crystal molecules located on the shielding areas 6b of the light emission control liquid crystal panel 6 by applying voltage to the shielding areas 6b, thereby transmitting the light received from the backlight 4 through the polarizing plate 7 through the light emission control liquid crystal panel 6 without changing the polarization axis thereof. Thus, the image display 1 can absorb the light transmitted through the shielding areas 6b of the light emission control liquid crystal panel 6 with the polarizing plate 8. Further, the image display 1 keeps the liquid crystal molecules located on the transmissive areas 6a of the light emission control liquid crystal panel 6 twisted by applying no voltage to the transmissive areas 6a, thereby transmitting the light received from the backlight 4 through the polarizing plate 7 through the light emission control liquid crystal panel 6 while changing the polarization axis thereof substantially by 90°. Thus, the image display 1 can transmit the light incident upon the polarizing plate 8 through the transmissive areas 6a of the light emission control liquid crystal panel 6 as such. Consequently, the image display 1 can easily block or transmit the light received from the backlight 4 through the light emission control liquid crystal panel 6 and the polarizing plates 7 and 8.

According to the first embodiment, the image display 1 can arbitrarily change the widths of the transmissive areas 6a and the shielding areas 6b by controlling application/nonapplication of voltage to the electrodes 6d provided on the unit areas 6c. In a stereoscopic image display mode described later, for example, the image display 1 can set each of the transmissive areas 6a and the shielding areas 6b to the width corresponding to two unit areas 6c by constituting each of the transmissive areas 6a and the shielding areas 6b of two unit areas 6c and applying no voltage to the two electrodes 6d corresponding to the two unit areas 6c constituting each transmissive area 6a while applying voltage to the two electrodes 6d corresponding to the two unit areas 6c constituting each shielding area 6b. In a view angle limitation mode described later, on the other hand, the image display 1 can set each transmissive area 6a to the width corresponding to two unit areas 6c while setting each shielding area 6b to the width corresponding to six unit areas 6c by constituting each transmissive area 6a and each shielding area 6b of two and six unit areas 6c respectively and applying no voltage to the two electrodes 6d corresponding to the two unit areas 6c constituting each transmissive area 6a while applying voltage to the six electrodes 6d corresponding to the six unit areas 6c constituting each shielding area 6b. Thus, the image display 1 can easily switch the two-screen display mode, the stereoscopic image display mode and the view angle limitation mode described later by controlling application/nonapplication of voltage to the electrodes 6d of the light emission control liquid crystal panel 6.

Figure 3:
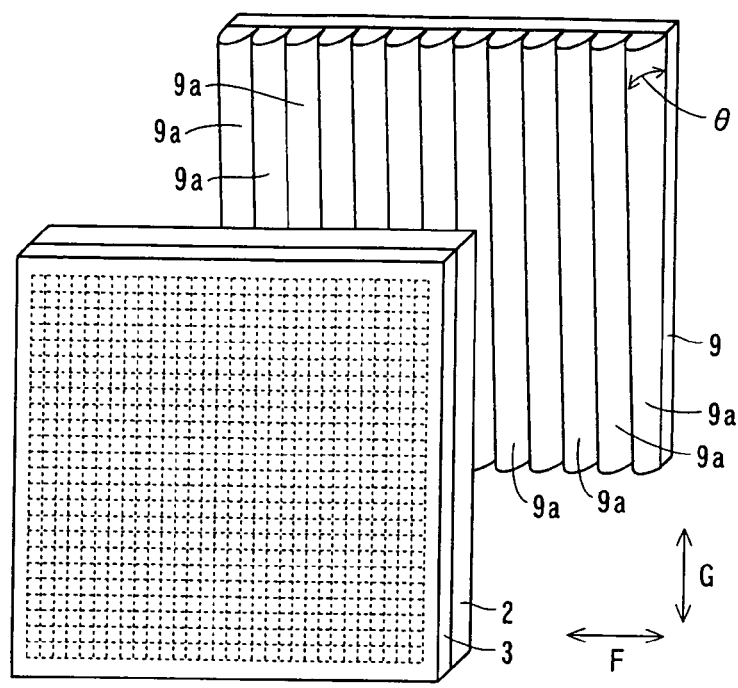
FIG. 3 is an enlarged perspective view of the display panel and a lenticular lens of the image display according to the first embodiment of the present invention shown in FIG. 1.

According to the first embodiment, a lenticular lens 9 is provided between the light emission control liquid crystal unit 5 and the display panel 2, as shown in FIGS. 1 and 2. This lenticular lens 9 is formed with a plurality of substantially semicylindrical lens portions 9a. The plurality of lens portions 9a are inclined by an angle θ (about 1° to about 3°) with respect to pixel trains of the display panel 2 extending in a direction G, as shown in FIG. 3. Thus, the longitudinal direction of the lens portions 9a and the directions (F and G in FIG. 3) of pixel arrangement of the display panel 2 are inconsistent with each other, whereby the image display 1 can inhibit the pixels of the display panel 1 from re-interfering with light irradiated from the backlight 4 and incident upon the display panel 2 with bright and dark stripes due to interference resulting from transmission through the lens portions 9a provided on the lenticular lens 9. Consequently, the image display 1 can suppress formation of interference fringes (moiré) on the display panel 2. As shown in FIG. 2, the lenticular lens 9 including the plurality of lens portions 9a has a function of advancing the light transmitted through the transmissive areas 6a of the light emission control liquid crystal panel 6 toward the observers 10 and 20. This lenticular lens 9 is an example of the "lens" in the present invention. The light emission control liquid crystal unit 5 including the light emission control liquid crystal panel 6 and the polarizing plates 7 and 8 and the lenticular lens 9 are arranged between the display panel 2 and the backlight 4, as shown in FIGS. 1 and 2.

(Two-Screen Display Mode)

A method of displaying planar images on two screens in the image display 1 according to the first embodiment of the present invention is now described with reference to FIGS. 5 to 7.

First, structures of the light emission control liquid crystal panel 6 and the display panel 2 for providing different images to the plurality of observers 10 and 20 located on different observational positions respectively are described with reference to FIGS. 5 to 7. In this two-screen display mode of the image display 1 according to the first embodiment of the present invention, each set of the transmissive and shielding areas 6a and 6b of the light emission control liquid crystal panel 6 is provided in correspondence to each lens portion 9a of the lenticular lens 9, as shown in FIGS. 6 and 7. In other words, the image display 1 constitutes each of the transmissive areas 6a and the shielding areas 6b of the light emission control liquid crystal panel 6 of four unit areas 6c by varying application/nonapplication of voltage with four electrodes 6d of the light emission control liquid crystal panel 6 as hereinabove described in the two-screen display mode.

Figure 5:
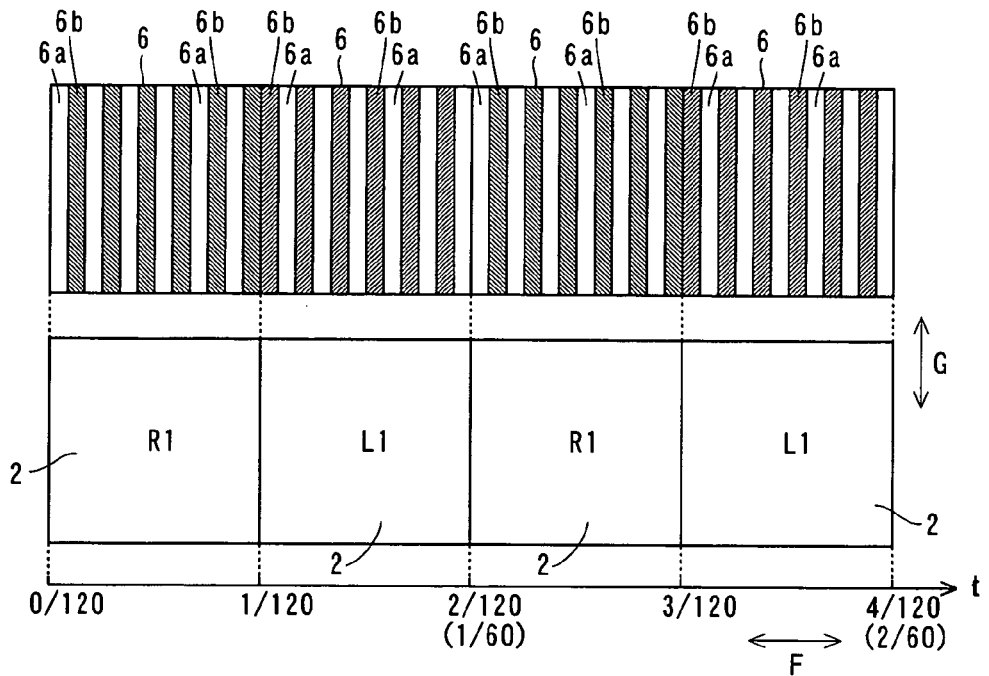
FIG. 5 illustrates states of the display panel and the light emission control liquid crystal panel observed by the observers in a two-screen display mode of the image display according to the first embodiment of the present invention shown in FIG. 1.

In order to display planar images on two screens according to the first embodiment, the image display 1 controls the light emission control liquid crystal panel 6 to switch the transmissive areas 6a for transmitting light and the shielding areas 6b for blocking light every ½ frame period (1/120 seconds) by controlling driving of the electrodes 6d, as shown in FIG. 5. The image display 1 further controls the display panel 2 to switch images R1 (e.g., planar images for car navigation) for the observer 10 and images L1 (e.g., planar images for television) for the observer 20 in synchronization with the switching between the transmissive areas 6a and the shielding areas 6b of the light emission control liquid crystal panel 6. The images R1 are examples of the "first image" in the present invention, and the images L1 are examples of the "second image" in the present invention.

Figure 6:
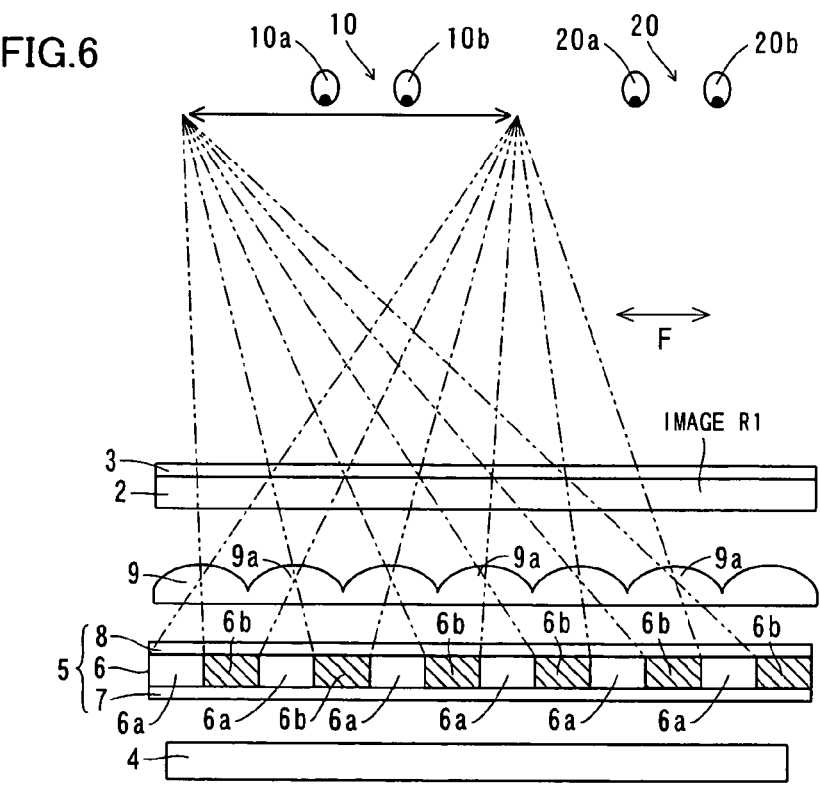
FIGS. 6 and 7 illustrate the display panel observed by the observers from above in the two-screen display mode of the image display according to the first embodiment of the present invention shown in FIG. 1.

When displaying the planar images on two screens in the aforementioned structure, the image display 1 transmits only light having the first polarization axis received from the backlight 4 through the polarizing plate 7 of the light emission control liquid crystal unit 5 and advances the same toward the light emission control liquid crystal panel 6 in a period between 0/120 and 1/120 seconds, as shown in FIG. 6. In this state shown in FIG. 6, the image display 1 arranges the transmissive areas 6a of the light emission control liquid crystal panel 6 for transmitting light on positions corresponding to the observer 10. Then, the image display 1 transmits the light having the first polarization axis through the transmissive areas 6a and the shielding areas 6b of the light emission control liquid crystal panel 6. At this time, the image display 1 transmits light incident upon the transmissive areas 6a receiving no voltage while changing the polarization axis substantially by 90° so that the light has the second polarization axis, and transmits light incident upon the shielding areas 6b receiving voltage without changing the polarization axis thereof. Thereafter the image display 1 introduces the light emitted from the transmissive areas 6a with the second polarization axis and the light emitted from the shielding areas 6b with the first polarization axis into the polarizing plate 8 of the light emission control liquid crystal unit 5. At this time, the image display 1 transmits the light incident upon the polarizing plate 8 via the transmissive areas 6a of the light emission control liquid crystal panel 6 through the polarizing plate 8 as such and advances the same toward the lenticular lens 9. On the other hand, the polarizing plate 8 absorbs light incident upon the same through the shielding areas 6b of the light emission control liquid crystal panel 6. In other words, the transmissive areas 6a and the shielding areas 6b of the light emission control liquid crystal panel 6 are provided for transmitting light and blocking light respectively. The lenticular lens 9 condenses the light transmitted through the polarizing plate 8 via the transmissive areas 6a of the light emission control liquid crystal panel 6 to advance the same toward the observer 10. At this time, the display panel 2 displays the images R1 for the observer 10, whereby the observer 10 can observe the images R1 for him/her with both eyes. On the other hand, the observer 20 receives no light irradiated from the backlight 4.

Figure 7:
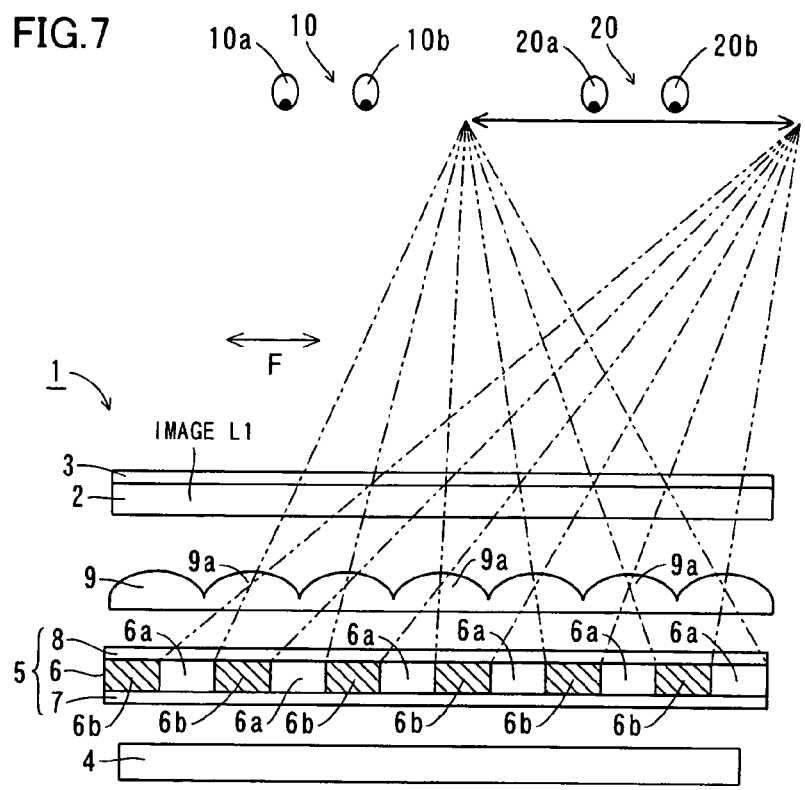

The image display 1 switches the positions of the transmissive areas 6a and the shielding areas 6b of the light emission control liquid crystal panel 6 shown in FIG. 6 to those shown in FIG. 7 in a period between 1/120 and 2/120 seconds when displaying the planar images on two screens. Thus, the image display 1 arranges the transmissive areas 6a for transmitting light on positions corresponding to the observer 20. The image display 1 transmits only the light having the first polarization axis received from the backlight 4 through the polarizing plate 7 of the light emission control liquid crystal unit 5 and advances the same toward the light emission control liquid crystal panel 6. Then, the image display 1 transmits the light having the first polarization axis through the transmissive areas 6a and the shielding areas 6b of the light emission control liquid crystal panel 6. At this time, the image display 1 transmits the light incident upon the transmissive areas 6a receiving no voltage while changing the polarization axis substantially by 90° so that the light has the second polarization axis, and transmits the light incident upon the shielding areas 6b receiving voltage without changing the polarization axis thereof. Thereafter the image display 1 introduces the light emitted from the transmissive areas 6a with the second polarization axis and that emitted from the shielding areas 6b with the first polarization axis into the polarizing plate 8 of the light emission control liquid crystal unit 5. At this time, the image display 1 transmits the light incident upon the polarizing plate 8 via the transmissive areas 6a of the light emission control liquid crystal panel 6 through the polarizing plate 8 as such and advances the same toward the lenticular lens 9. On the other hand, the polarizing plate 8 absorbs the light incident upon the same through the shielding areas 6b of the light emission control liquid crystal panel 6. The lenticular lens 9 condenses the light transmitted through the polarizing plate 8 via the transmissive areas 6a of the light emission control liquid crystal panel 6 to advance the same toward the observer 20. At this time, the display panel 2 displays the images L1 for the observer 20, whereby the observer 20 can observe the images L1 for him/her with both eyes. On the other hand, the observer 10 receives no light irradiated from the backlight 4.

In a period between 2/120 and 3/120 seconds for displaying the planar images on two screens, the observer 10 observers the images R1 displayed on the display panel 2 while the observer 20 receives no light irradiated from the backlight 4, similarly to the period between 0/120 and 1/120 seconds shown in FIG. 6. In a period between 3/120 and 4/120 seconds for displaying the planar images on two screens, the observer 20 observes the images L1 displayed on the display panel 2 while the observer 10 receives no light irradiated from the backlight 4, similarly to the period between 1/120 and 2/120 seconds shown in FIG. 7. The image display 1 thereafter repeats similar operations every 1/60 seconds (2/120 seconds). Thus, the observers 10 and 20 can observe the images R1 and L1 respectively in one frame period (2/120 seconds (1/60 seconds)). Consequently, the observers 10 and 20 simultaneously recognize that they continuously observe the images R1 and L1 displayed on the display panel 2 respectively, whereby the image display 1 can provide different images having small image deterioration to the observers 10 and 20 respectively.

(Stereoscopic Image Display Mode)

A stereoscopic image display method of the image display 1 according to the first embodiment of the present invention is now described with reference to FIGS. 8 to 10.

First, structures of the light emission control liquid crystal panel 6 and the display panel 2 for providing stereoscopic images to the observers 10 and 20 located on different observational positions respectively. In this stereoscopic image display mode of the image display 1 according to the first embodiment of the present invention, two sets of the transmissive and shielding areas 6a and 6b of the light emission control liquid crystal panel 6 are provided in correspondence to each lens portion 9a of the lenticular lens 9, as shown in FIGS. 9 and 10. In other words, the image display 1 constitutes each of the transmissive areas 6a and the shielding areas 6b of the light emission control liquid crystal panel 6 of two unit areas 6c by varying application/nonapplication of voltage with six electrodes 6d of the light emission control liquid crystal panel 6 for switching from the two-screen display mode to the stereoscopic image display mode, as hereinabove described.

Figure 8:
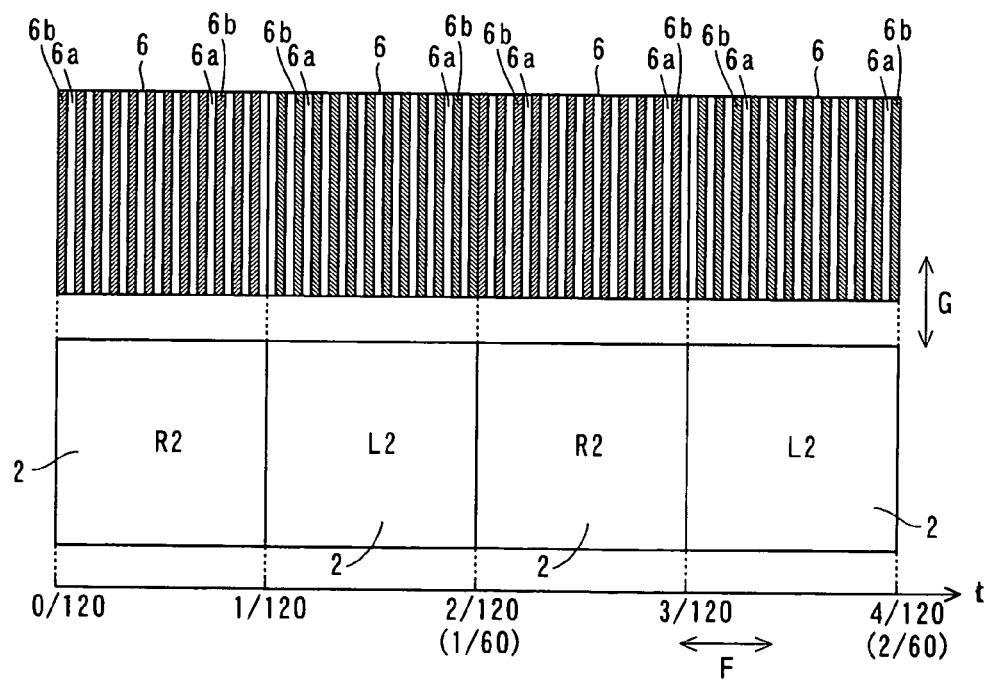
FIG. 8 illustrates states of the display panel and the light emission control liquid crystal panel observed by the observers in a stereoscopic image display mode of the image display according to the first embodiment of the present invention shown in FIG. 1.

In the stereoscopic image display mode, the image display 1 according to the first embodiment controls the light emission control liquid crystal panel 6 to switch the transmissive areas 6a and the shielding areas 6b every ½ frame period (1/120 seconds) of the display panel 2 by controlling driving of the electrodes 6d, as shown in FIG. 8. The image display 1 further controls the display panel 2 to switch right-eye images R2 to be introduced into the right eyes 10a and 20a of the observers 10 and 20 and left-eye images L1 to be introduced into the left eyes 10b and 20b of the observers 10 and 20 respectively every ½ frame period (1/120 seconds) of the display panel 2 in synchronization with the switching between the transmissive areas 6a and the shielding areas 6b of the light emission control liquid crystal panel 6. The right-eye images R2 are examples of the "first image" in the present invention, and the left-eye images L2 are examples of the "second image" in the present invention.

Figure 9:
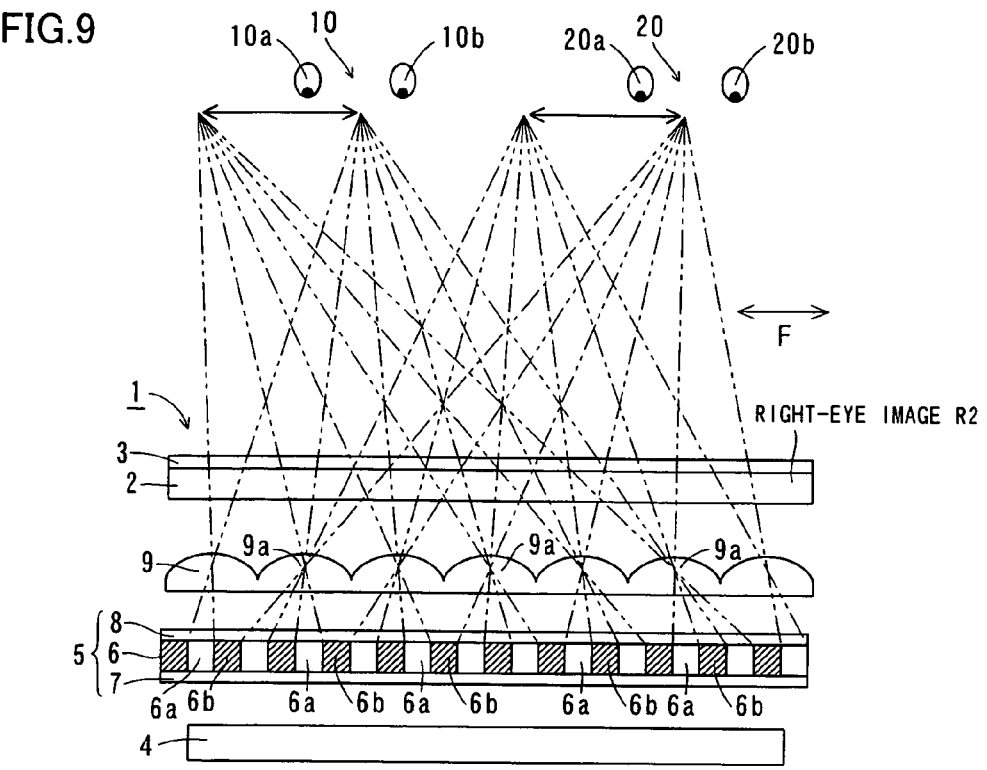
FIGS. 9 and 10 illustrate the display panel and the light emission control liquid crystal panel observed by the observers from above in the stereoscopic image display mode of the image display according to the first embodiment of the present invention shown in FIG. 1.

When displaying stereoscopic images in the aforementioned structure, the image display 1 transmits only light having the first polarization axis received from the backlight 4 through the polarizing plate 7 of the light emission control liquid crystal unit 5 and advances the same toward the light emission control liquid crystal panel 6, as shown in FIG. 9. In the state shown in FIG. 9, the transmissive areas 6a of the light emission control liquid crystal panel 6 for transmitting light are arranged on positions corresponding to the right eyes 10a and 20a of the observers 10 and 20. The image display 1 transmits the light having the first polarization axis through the transmissive areas 6a and the shielding areas 6b of the light emission control liquid crystal panel 6. At this time, the image display 1 transmits the light incident upon the transmissive areas 6a receiving no voltage while changing the polarization axis substantially by 90° so that the light has the second polarization axis, and transmits the light incident upon the shielding areas 6b receiving voltage without changing the polarization axis thereof. Thereafter the image display 1 introduces the light emitted from the transmissive areas 6a with the second polarization axis and the light emitted from the shielding areas 6b with the first polarization axis into the polarizing plate 8 of the light emission control liquid crystal unit 5. At this time, the image display 1 transmits the light incident upon the polarizing plate 8 via the transmissive areas 6a of the light emission control liquid crystal panel 6 through the polarizing plate 8 as such and advances the same toward the lenticular lens 9. On the other hand, the polarizing plate 8 absorbs the light incident upon the same through the shielding areas 9b of the light emission control liquid crystal panel 6. The lenticular lens 9 condenses the light transmitted through the polarizing plate 8 via the transmissive areas 6a of the light emission control liquid crystal panel 6 for advancing the same toward the right eyes 10a and 20a of the observers 10 and 20. At this time, the image display 1 displays the right-eye images R2 on the display panel 2, for introducing the right-eye images R2 into the right eyes 10a and 20a of the observers 10 and 20. On the other hand, no light irradiated from the backlight 4 reaches the left eyes 10b and 20b of the observers 10 and 20.

Figure 10:
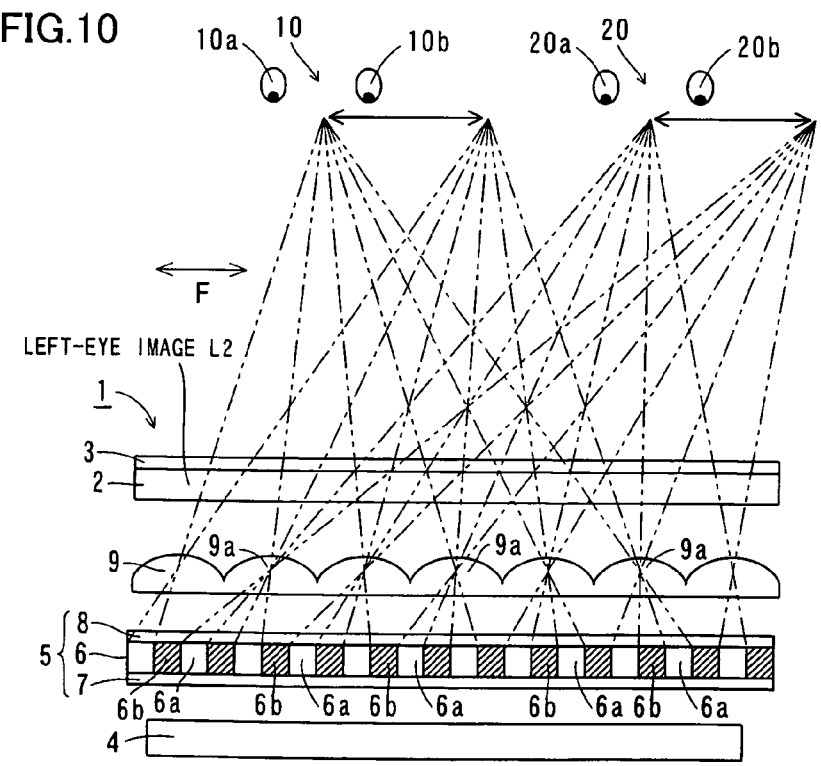

In a period between 1/120 and 2/120 seconds of the stereoscopic image display mode, the image display 1 switches the positions of the transmissive areas 6a and 6b of the light emission control liquid crystal panel 6 shown in FIG. 9 to those shown in FIG. 10. Thus, the image display 1 arranges the transmissive areas 6a of the light transmission control liquid crystal panel 6 for transmitting light on positions corresponding to the left eyes 10b and 20b of the observers 10 and 20. The image display 1 transmits only the light having the first polarization axis received from the backlight 4 through the polarizing plate 7 of the light emission control liquid crystal unit 5 and advances the same toward the light emission control liquid crystal panel 6. The image display 1 transmits the light having the first polarization axis through the transmissive areas 6a and the shielding areas 6b of the light emission control liquid crystal panel 6. At this time, the image display 1 transmits the light incident upon the transmissive areas 6a receiving no voltage while changing the polarization axis substantially by 90° so that the light has the second polarization axis, and transmits the light incident upon the shielding areas 6b receiving voltage without changing the polarization axis thereof. The image display 1 introduces the light emitted from the transmissive areas 6a with the second polarization axis and the light emitted from the shielding areas 6b with the first polarization axis into the polarizing plate 8 of the light emission control liquid crystal unit 5. At this time, the image display 1 transmits the light incident upon the polarizing plate 8 via the transmissive areas 6a of the light emission control liquid crystal panel 6 through the polarizing plate 8 as such and advances the same toward the lenticular lens 9. On the other hand, the polarizing plate 8 absorbs the light incident upon the same through the shielding areas 6b of the light emission control liquid crystal panel 6. The lenticular lens 9 condenses the light transmitted through the polarizing plate 8 via the transmissive areas 6a of the light emission control liquid crystal panel 6 for advancing the same toward the left eyes 10b and 20b of the observers 10 and 20. At this time, the image display 1 displays the left-eye images L2 on the display panel 2, thereby introducing the left-eye images L2 into the left eyes 10b and 20b of the observers 10 and 20. On the other hand, no light irradiated from the backlight 4 reaches the right eyes 10a and 20a of the observer 10 and 20.

In a period between 2/120 and 3/120 seconds of the stereoscopic image display mode, the image display 1 introduces the right-eye images R2 into the right eyes 10a and 20a of the observers 10 and 20 while guiding no light irradiated from the backlight 4 to the left eyes 10b and 20b of the observers 10 and 20 as shown in FIG. 9, similarly to the period between 0/120 and 1/120 seconds. In a period between 3/120 and 4/120 seconds of the stereoscopic image display mode, the image display 1 introduces the left-eye images L2 displayed on the display panel 2 into the left eyes 10b and 20b of the observers 10 and 20 while guiding no light irradiated from the backlight 4 to the right eyes 10a and 20a of the observers 10 and 20 as shown in FIG. 10, similarly to the period between 1/120 and 2/120 seconds. The image display 1 thereafter repeats similar operations every 1/60 seconds (2/120 seconds). Thus, the observers 10 and 20 can observe the right-eye images R2 and the left-eye images L2 with the right eyes 10a and 20a and the left eyes 10b and 20b respectively in one frame period (2/120 seconds (1/60 seconds)). Consequently, the observer 10 (20) simultaneously recognizes that he/she continuously observes the right- and left-eye images R2 and L2 displayed on the display panel 2 with the right and left eyes 10a and 10b (20a and 20b) respectively, whereby the observers 10 and 20 can observe stereoscopic images having small image deterioration.

(View Angle Limitation Mode)

Figure 11:
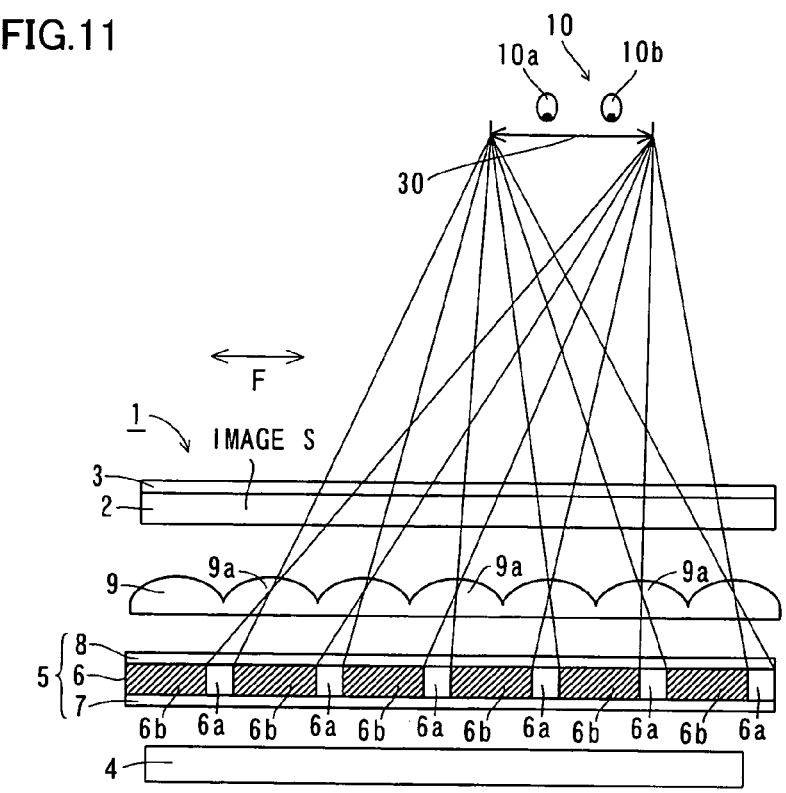
FIG. 11 illustrates states of the display panel observed by the observers from above in a view angle limitation mode of the image display according to the first embodiment of the present invention shown in FIG. 1.

A view angle limitation method of the image display 1 according to the first embodiment of the present invention is now described with reference to FIG. 11.

First, structures of the light emission control liquid crystal panel 6 and the display panel 2 for providing images to only a region 30 where the observer 10 is located are described with reference to FIG. 11. Each set of the transmissive and shielding areas 6a and 6b of the light emission control liquid crystal panel 6 is provided in correspondence to each lens portion 9a of the lenticular lens 9, as shown in FIG. 11.

In this view angle limitation mode according to the first embodiment, the image display 1 varies application/nonapplication of voltage with each set of two electrodes 6d (see FIG. 4) and each set of six electrodes 6d provided on the light emission control liquid crystal panel 6 respectively as hereinabove described, thereby constituting each transmissive area 6a and each shielding area 6b of the light emission control liquid crystal panel 6 of two unit areas 6c and six unit areas 6c respectively for switching from the two-screen display mode or the stereoscopic image display mode to the view angle limitation angle. Thus, the image display 1 can set the lengths of the transmissive areas 6a and the shielding areas 6b in the direction F to the widths corresponding to two unit areas 6c and six unit areas 6c respectively. Therefore, the image display 1 can limit the area observable by the observer 10. The display panel 2 displays an image S provided to the observer 10, as shown in FIG. 11.

When limiting the view angle in the aforementioned structure, the image display 1 transmits only the light having the first polarization axis received from the backlight 4 through the polarizing plate 7 of the light emission control liquid crystal unit 5 and advances the same toward the light emission control liquid crystal panel 6. The image display 1 transmits the light having the first polarization axis through the transmissive areas 6a and the shielding areas 6b of the light emission control liquid crystal panel 6. At this time, the image display 1 transmits the light incident upon the transmissive areas 6a receiving no voltage while changing the polarization axis substantially by 90° so that the light has the second polarization axis, and transmits the light incident upon the shielding areas 6b receiving voltage without changing the polarization axis thereof. Thereafter the image display 1 introduces the light emitted from the transmissive areas 6a with the second polarization axis and the light emitted from the shielding areas 6b with the first polarization axis into the polarizing plate 8 of the light emission control liquid crystal unit 5. At this time, the image display 1 transmits the light incident upon the polarizing plate 8 via the transmissive areas 6a of the light emission control liquid crystal panel 6 through the polarizing plate 8 as such and advances the same toward the lenticular lens 9. On the other hand, the polarizing plate 8 absorbs the light incident upon the same through the shielding areas 6b of the light emission control liquid crystal panel 6. The lenticular lens 9 condenses the light transmitted through the polarizing plate 8 via the transmissive areas 6a of the light emission control liquid crystal panel 6 for advancing the same toward the observer 10. In other words, the image display 1 blocks the light passing through the shielding areas 6b each having the width corresponding to six unit areas 6c, for guiding the light received from the backlight 5 to only the region 30 where the observer 10 is located.

(Effects of First Embodiment)

According to the first embodiment, as hereinabove described, the image display 1 can change the length of arrival areas of light condensed on the positions of the observers 10 and 20 in the direction F by changing the lengths of the transmissive areas 6a and the shielding areas 6b of the light emission control liquid crystal panel 6 each having the width corresponding to four unit areas 6c. Therefore, the image display 1 can reduce the length of arrival areas of light condensed on the positions of the observers 10 and 20 in the direction F and subdivide the arrival areas by reducing the number of the unit areas 6c constituting each of the transmissive areas 6a and the shielding areas 6b of the light emission control liquid crystal panel 6 from four to two and subdividing the sets of the transmissive areas 6a and the shielding areas 6b. Thus, the image display 1 can condense the light received from the backlight 4 in the vicinity of the eyes of the observers 10 and 20 respectively. Consequently, the image display 1 can provide stereoscopic images to the observers 10 and 20 by displaying the left- and right-eye images L2 and R2 on the display panel 2. Further, the image display 1 can increase the length of the arrival areas of the light condensed on the positions of the observers 10 and 20 in the direction F through the same light emission control liquid crystal panel 6 by constituting each of the transmissive areas 6a and the shielding areas 6b of the light emission control liquid crystal panel 6 of four unit areas 6c. Thus, the image display 1 can condense the light received from the backlight 4 in the vicinity of both eyes of the observers 10 and 20 respectively through the same light emission control liquid crystal panel 6. Consequently, the image display 1 can provide different images R1 and L1 (planar images) to the plurality of observers 10 and 20 located on different observational positions respectively by displaying the images R1 and L1 on the display panel 2. Thus, the image display 1 according to the first embodiment can provide stereoscopic images to the plurality of observers 10 and 20 while providing different images R1 and L1 (planar images) to the plurality of observers 10 and 20 located on different observational positions respectively through the same light emission control liquid crystal panel 6.

In the view angle limitation mode according to the first embodiment, the image display 1 can reduce the length of the region 30 where the light received through the transmissive areas 6a of the light emission control liquid crystal panel 6 is condensed in the direction F shown in FIG. 1 by controlling driving of the plurality of electrodes 6d of the light emission control liquid crystal panel 6 thereby controlling the length of the transmissive areas 6a in the direction F shown in FIG. 1, for reducing the region 30 where the observer 10 can observe the image S displayed on the display panel 2. Thus, the image display 1 can limit the view angle of the observer 10 observing the image S displayed on the display panel 2, thereby inhibiting the other observer 20 from observing the image S of the display panel 2 observed by the observer 10.

Second Embodiment

Figure 12:
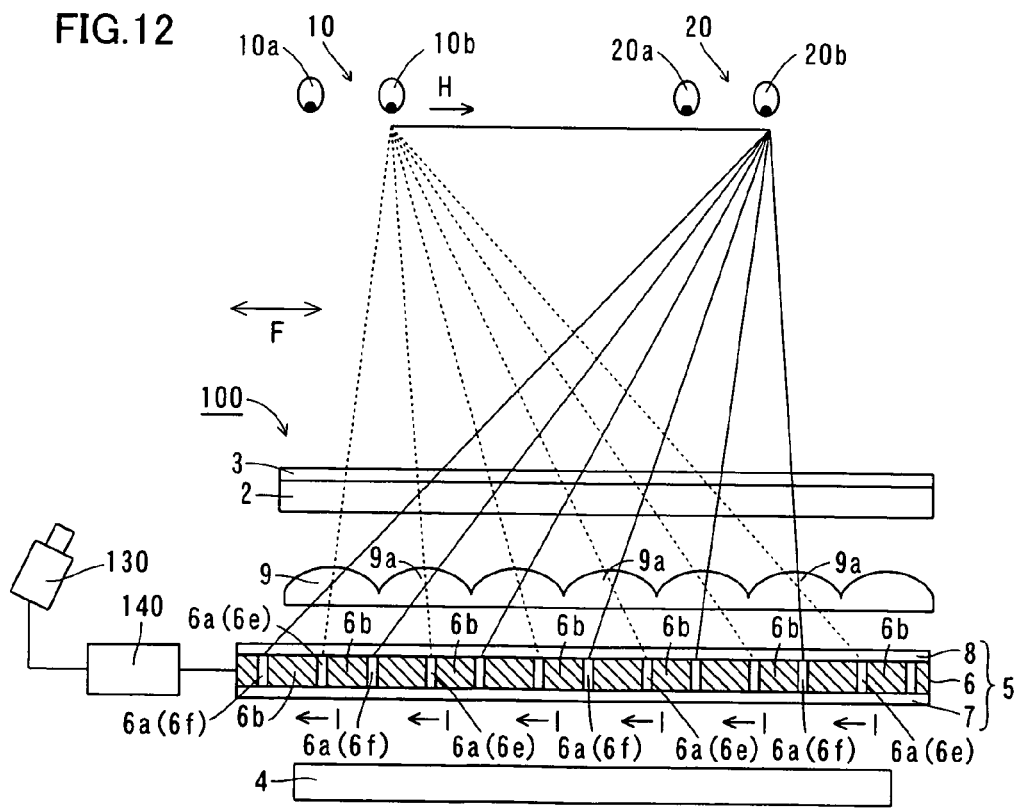
FIG. 12 illustrates a display panel observed by observers from above in an image display according to a second embodiment of the present invention.

Referring to FIG. 12, an image display 100 according to a second embodiment of the present invention changes the position for displaying stereoscopic images following movement of the observational position of an observer, dissimilarly to the aforementioned first embodiment.

As shown in FIG. 12, the image display 100 according to the second embodiment comprises a position sensor 130 for sensing the position of an observer 10 and a control portion 140 for moving transmissive areas 6a for transmitting light and shielding areas 6b for blocking light by driving electrodes 6d of a light emission control liquid crystal panel 6 of a light emission control liquid crystal unit 5 in response to the position of the observer 10 sensed by the position sensor 130. The position sensor 130 is an example of the "position sensing means" in the present invention. According to the second embodiment, the image display 100 constitutes each transmissive area 6a of the light transmission control liquid crystal panel 6 of one unit area 6c (see FIG. 4) while constituting the shielding areas 6b of the remaining unit areas 6c other than those constituting the transmissive areas 6a by controlling driving of electrodes 6d (see FIG. 4) of the light emission control liquid crystal panel 6, for switching to a mode (head tracking mode) changing positions for displaying stereoscopic images following movement of the observational position of an observer. The transmissive areas 6a include pixel areas 6e and 6f provided in correspondence to left eyes 10b and 20b of the observer 10 and another observer 20 respectively. The remaining structure of the second embodiment is similar to that of the aforementioned first embodiment.

It is assumed that the observer 10 moves along arrow H in FIG. 12 while the observer 20 remains unmoving in the image display 100 according to the second embodiment having the aforementioned structure. In this case, the position sensor 130 senses the movement of the observational position of the observer 10 along arrow H in FIG. 12. Then, the position sensor 130 transmits movement sensing information to the control portion 140. On the basis of this movement sensing information, the control portion 140 moves the pixel areas 6e provided on the light emission control liquid crystal panel 6 in correspondence to the left eye 10b of the observer 10 along arrow I in FIG. 12 for introducing light transmitted through the pixel areas 6e included in the transmissive areas 6a into the left eye 10b of the observer 10. At this time, the control portion 140 does not move the pixel areas 6f, provided in correspondence to the left eye 20b of the unmoving observer 20, included in the transmissive areas 6a. The control portion 140 switches the transmissive areas 6a and the shielding areas 6b of the light emission control liquid crystal panel 6 every 1/120 second, while switching left- and right-eye images displayed on the display panel 2 in synchronization with the switching operation on the transmissive areas 6a and the shielding areas 6b of the light emission control liquid crystal panel 6.

(Effects of Second Embodiment)

According to the second embodiment, as hereinabove described, the image display 100m provided with the position sensor 130 for sensing the position of the observer 10 and the control portion 140 for moving the transmissive areas 6a and the shielding areas 6b of the light emission control liquid crystal panel 6 in response to the position of the observer 10 sensed by the position sensor 130, can sense movement of the observer 10 with the position sensor 130 and move the pixel areas 6e, provided in correspondence to the left eye 10b of the observer 10, included in the transmissive areas 6a of the light transmission control liquid crystal panel 6 on the basis of movement sensing information as to the observer 10. Thus, the image display 100 can provide proper images to the observer 10 also when he/she moves. When the position sensor 130 according to the second embodiment is enabled to sense movement of a plurality of observers by image recognition or the like and the control portion 140 is enabled to individually move the transmissive areas 6a and the shielding areas 6b corresponding to the plurality of observers respectively, the image sensor 100 can provide proper stereoscopic images to the observers respectively also when the plurality of observers move.

Third Embodiment

Figure 13:
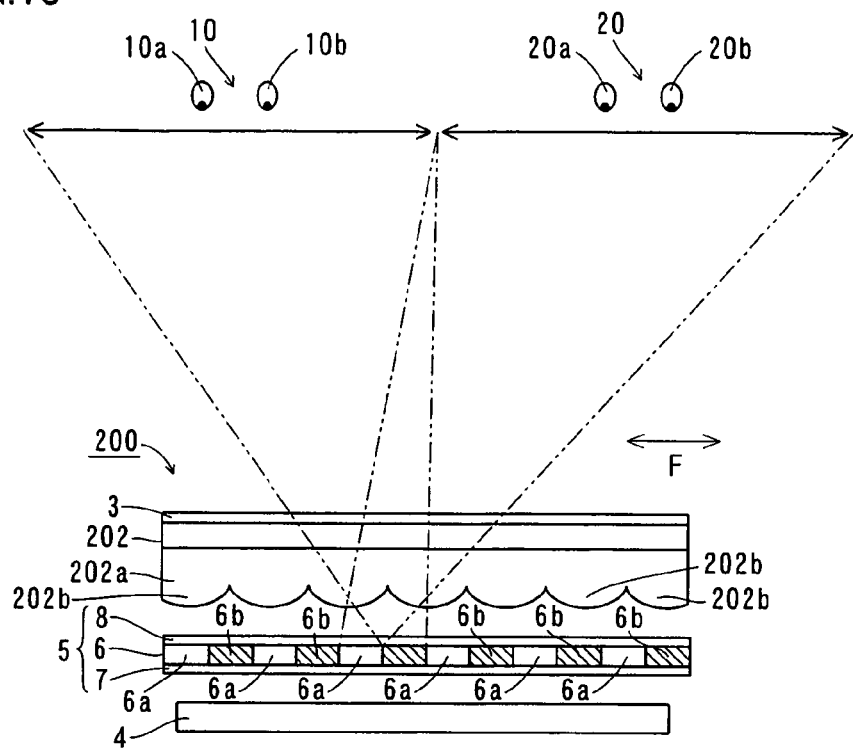
FIG. 13 illustrates a display panel observed by observers from above in an image display according to a third embodiment of the present invention.

Referring to FIG. 13, a lenticular lens portion 202a is integrated with a display panel 202 in an image display 200 according to a third embodiment of the present invention, dissimilarly to the aforementioned first embodiment. The remaining structure of the third embodiment is similar to that of the aforementioned first embodiment, and hence redundant description is not repeated.

As shown in FIG. 13, the image display 200 according to the third embodiment of the present invention comprises the display panel 202 for displaying images, a polarizing plate 3 mounted on a side of the display panel 202 closer to observers 10 and 20 and a backlight 4 for irradiating light toward the display panel 202.

According to the third embodiment, the display panel 202 is integrated with the lenticular lens portion 202a. Thus, the number of components can be reduced as compared with a case of providing the lenticular lens portion 202a and the display panel 202 independently of each other. The lenticular lens portion 202a is formed with a plurality of substantially semicylindrical lens portions 202b. The lenticular lens portion 202a is an example of the "lens" or the "lenticular lens" in the present invention.

Fourth Embodiment

Figure 14:
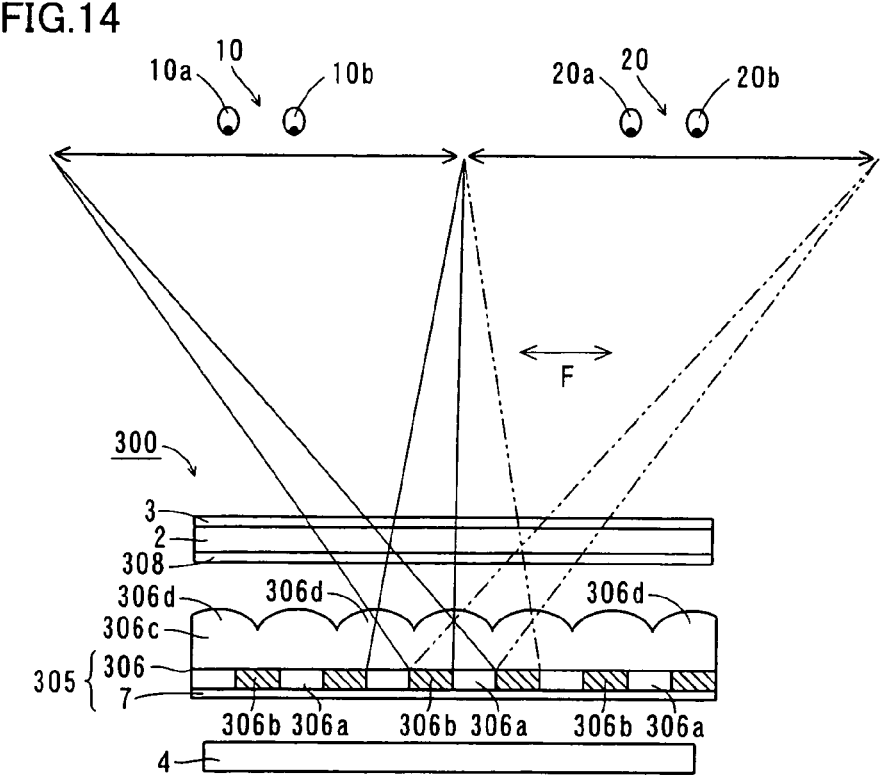
FIG. 14 illustrates a display panel observed by observers from above in an image display according to a fourth embodiment of the present invention.

Referring to FIG. 14, a lenticular lens portion 306c is integrated with a light emission control liquid crystal panel 306 in an image display 300 according to a fourth embodiment of the present invention, dissimilarly to the aforementioned third embodiment. The remaining structure of the fourth embodiment is similar to that of the aforementioned first embodiment, and hence redundant description is not repeated.

As shown in FIG. 14, the image display 300 according to the fourth embodiment comprises a display panel 2 for displaying images, a polarizing plate 3 mounted on a side of the display panel 2 closer to observers 10 and 20 and a backlight 4 for irradiating light toward the display panel 2.

A light emission control liquid crystal unit 305 is arranged on a side of the backlight 4 closer to the observers 10 and 20. The light emission control liquid crystal unit 305 is an example of the "light emission control means" in the present invention. This light emission control liquid crystal unit 305 includes the light emission control liquid crystal panel 306 having transmissive areas 306a and shielding areas 306b for transmitting and blocking the light irradiated from the backlight 4 respectively and a polarizing plate 7 arranged on a side of the light emission control liquid crystal panel 306 closer to the backlight 4. The transmissive areas 306a are examples of the "transmissive portion" or the "transmissive area" in the present invention, and the shielding areas 306b are examples of the "shielding portion" or the "shielding area" in the present invention.

According to the fourth embodiment, the light emission control liquid crystal panel 306 is integrated with the lenticular lens portion 306c. Thus, the number of components can be reduced as compared with a case of providing the lenticular lens portion 306c and the light emission control liquid crystal panel 306 independently of each other. The lenticular lens portion 306c is formed with a plurality of substantially semicylindrical lens portions 306d. According to the fourth embodiment, a polarizing plate 308, which cannot be arranged on a side of the light emission control liquid crystal panel 306 closer to observers 10 and 20 due to the lenticular lens portion 306c integrated with the light emission control liquid crystal panel 306, must be provided on a side of the display panel 2 closer to the backlight 4. The lenticular lens portion 306c is an example of the "lens" or the "lenticular lens" in the present invention. The polarizing plate 308 is an example of the "second polarizing plate" in the present invention.

Although the present invention has been described and illustrated in detail, it is clearly understood that the same is by way of illustration and example only and is not to be taken by way of limitation, the spirit and scope of the present invention being limited only by the terms of the appended claims.

Figure 15:
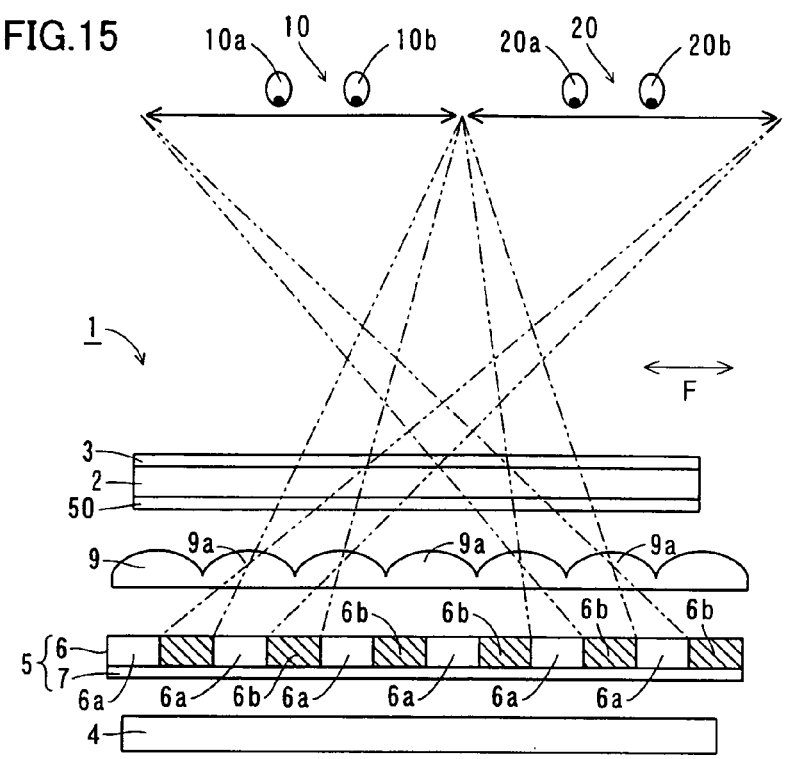
FIG. 15 shows a display panel observed by observers from above for illustrating the structure of an image display according to a first modification of the first embodiment of the present invention shown in FIG. 1.

For example, while the polarizing plate 8 is provided on the side of the light emission control liquid crystal panel 6 closer to the observers 10 and 20 in the aforementioned first embodiment, the present invention is not restricted to this but a polarizing plate 50 may alternatively be provided on a side of a display panel 2 closer to a backlight 4 as in a first modification of the first embodiment of the present invention shown in FIG. 15.

Figure 16:
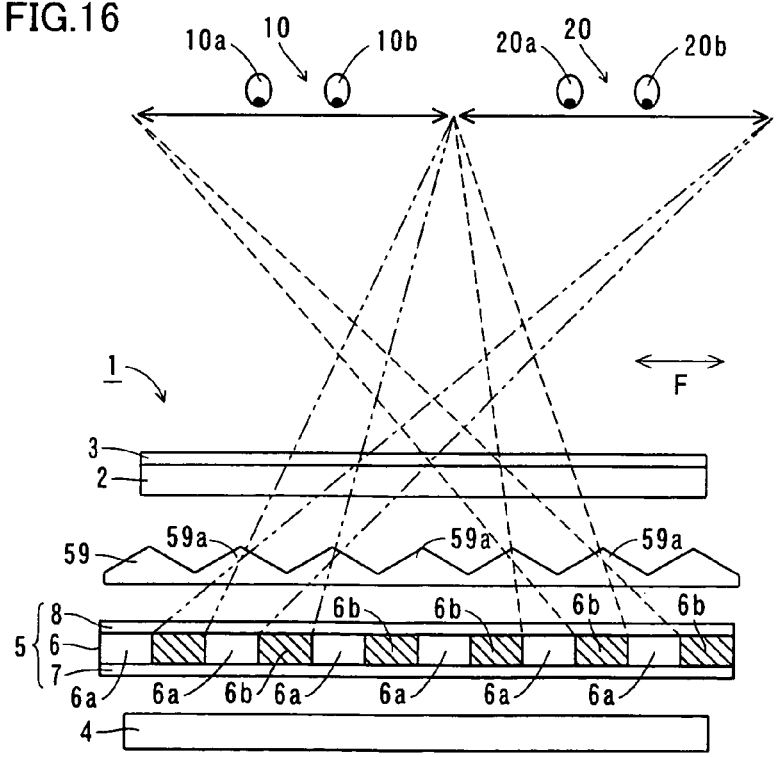
FIG. 16 shows a display panel observed by observers from above for illustrating the structure of an image display according to a second modification of the first embodiment of the present invention shown in FIG. 1.

While the lenticular lens 9 is arranged between the light emission control liquid crystal unit 5 and the display panel 2 in the aforementioned first embodiment, the present invention is not restricted to this but a striped prism lens 59 formed by a plurality of lens portions 59a extending perpendicularly to the plane of FIG. 16 may alternatively be arranged between a light emission control liquid crystal unit 5 and a display panel 2 as in a second modification of the first embodiment of the present invention shown in FIG. 16.

Figures 17, 18:
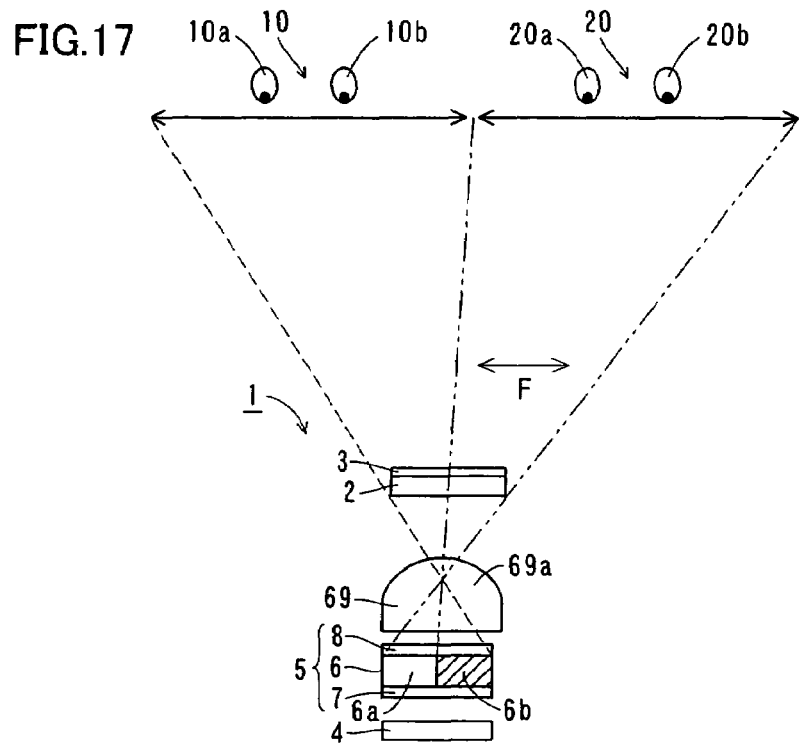
FIG. 17 shows a display panel observed by observers from above for illustrating the structure of an image display according to a third modification of the first embodiment of the present invention shown in FIG. 1.
FIG. 18 shows a display panel observed by observers from above for illustrating the principle of an exemplary conventional stereoscopic image display.

While the lenticular lens 9 having the plurality of lens portions 9a is arranged between the display panel 2 and the light emission control liquid crystal unit 5 in the aforementioned first embodiment, the present invention is not restricted to this but a lenticular lens 69 having a lens portion 69a may alternatively be arranged between a display panel 2 and a light emission control liquid crystal unit 5 as in a third modification of the first embodiment of the present invention shown in FIG. 17.

While the polarizing plates 7 and 8 arranged to hold the light emission control liquid crystal panel 6 therebetween have polarization axes perpendicular to each other in the aforementioned first embodiment, the present invention is not restricted to this but the polarizing plates 7 and 8 arranged to hold the light emission control liquid crystal panel 6 therebetween may alternatively be formed by polarizing plates having the same polarization axis, for example, in response to the liquid crystal mode of the light emission control liquid crystal panel 6.

While the polarizing plate 7 of the light emission control liquid crystal unit 5 transmits the light having the first polarization axis and absorbs the light having the second polarization axis in the aforementioned first embodiment, the present invention is not restricted to this but the polarizing plate 7 may alternatively transmit light having a polarization axis other than the first polarization axis and absorb light having a polarization axis substantially perpendicular to the polarization axis other than the first polarization axis. Further, while the polarizing plate 8 of the light emission control liquid crystal unit 5 transmits the light having the second polarization axis substantially perpendicular to the first polarization axis and absorbs the light having the first polarization axis, the present invention is not restricted to this but the polarizing plate 8 may alternatively transmit light having a polarization axis other than the second polarization axis and absorb light having a polarization axis substantially perpendicular to the polarization axis other than the second polarization axis.

While the image display 1 transmits the light through the transmissive areas 6a and blocks the light through the shielding areas 6b by applying no voltage to the transmissive areas 6a while applying voltage to the shielding areas 6b in the aforementioned first embodiment, the present invention is not restricted to this but the image display 1 may alternatively transmit the light through the transmissive areas 6a and block the light through the shielding areas 6b by applying voltage to the transmissive areas 6a while applying no voltage to the shielding areas 6b.

While the image display 1 switches the transmissive areas 6a and the shielding areas 6b of the light emission control liquid crystal panel 6 every ½ frame period in the two-screen display mode and the stereoscopic image display mode in the aforementioned first embodiment, the present invention is not restricted to this but the image display 1 may alternatively switch the transmissive areas 6a and the shielding areas 6b of the light emission control liquid crystal panel 6 every 1/n (e.g. ¼) frame period (n: natural number of at least two). When switching the transmissive areas 6a and the shielding areas 6b of the light emission control liquid crystal panel 6 every 1/n frame period in the two-screen display mode, the image display 1 must switch the images R1 and L1 displayed on the display panel 2 every 1/n frame period. When switching the transmissive areas 6a and the shielding areas 6b of the light emission control liquid crystal panel 6 every 1/n frame period in the stereoscopic image display mode, the image display 1 must switch the right- and left-eye images R2 and L2 displayed on the display panel 2 every 1/n frame period.

What is claimed is:

1. An image display comprising:
a display panel for displaying images;
a light source for irradiating light toward said display panel;
light emission control means arranged between said light source and said display panel, provided with a transmissive portion and a shielding portion extending in a second direction intersecting with a first direction connecting the left and right eyes of an observer with each other for transmitting and blocking said light irradiated from said light source respectively, and capable of changing the length of said transmissive portion and said shielding portion in said first direction; and
a lens including at least one lens portion formed to advance said light received from said light source through said transmissive portion of said light emission control means in a prescribed direction and to extend in said second direction, wherein
said light emission control means is able to switch between a function of providing different planar images to observers located on different observational positions respectively and a function of providing stereoscopic images to a plurality of observers, by changing the length of said transmissive portion and said shielding portion of said light emission control means in said first direction thereby controlling an arrival position of said light received from said light source through said transmissive portion of said light emission control means;
said lens includes a lenticular lens having a substantially semicylindrical lens portion provided in correspondence to a set of said transmissive portion and said shielding portion to extend in said second direction;
providing said different planar images to said observers located on said different observational positions respectively by associating one said lens portion of said lenticular lens with said set of said transmissive portion and said shielding portion of said light emission control means thereby condensing light on regions where different said observers are located, and providing said stereoscopic images to said plurality of observers by associating one said lens portion of said lenticular lens with a plurality of sets of said transmissive portions and said shielding portions of said light emission control means thereby condensing light on the respective portions of the right and left eyes of said observers; and
said light emission control means includes a light emission control liquid crystal panel provided with a transmissive area and a shielding area extending in said second direction alternately in said first direction for transmitting and blocking said light irradiated from said light source respectively as well as a first polarizing plate and a second polarizing plate opposed to each other through said light emission control liquid crystal panel.

2. The image display according to claim 1, wherein
said light emission control liquid crystal panel is constituted to be able to switch said transmissive area and said shielding area.

3. The image display according to claim 1, wherein
said light emission control liquid crystal panel is provided with a plurality of electrodes for controlling said transmissive area and said shielding area of said light emission control liquid crystal panel adjacently in said first direction, and
said light emission control liquid crystal panel changes the length of said transmissive area and said shielding area in said first direction by controlling driving of said plurality of electrodes of said light emission control liquid crystal panel.

4. The image display according to claim 3, wherein said plurality of electrodes of said light emission control liquid crystal panel extend along said second direction respectively.

5. The image display according to claim 3, wherein said light emission control liquid crystal panel limits regions observable by said observers by controlling driving of said plurality of electrodes of said light emission control liquid crystal panel thereby controlling the length of said transmissive area in said first direction.

6. The image display according to claim 5, wherein said light emission control liquid crystal panel is constituted to be able to switch said transmissive area and said shielding area.

7. The image display according to claim 1, controlling said transmissive portion and said shielding portion of said light emission control means to switch every 1/n frame period of said display panel, wherein n is a natural number of at least two; and controlling said display panel to switch a first image and a second image displayed on said display panel in synchronization with switching between said transmission portion and said shielding portion of said light emission control means.

8. The image display according to claim 7, wherein said 1/n frame period is a ½ frame period.

9. The image display according to claim 1, wherein said light emission control means includes a light emission control liquid crystal panel provided with a transmissive area and a shielding area extending in said second direction alternately in said first direction for transmitting and blocking said light irradiated from said light source respectively, the image display further comprising:

position sensing means for sensing the positions of said observers, and a control portion for moving said transmissive area and said shielding area of said light emission control liquid crystal panel in response to the positions of said observers sensed by said position sensing means.

10. The image display according to claim 1, wherein said lens portion of said lens formed to extend in said second direction is provided in a state inclined by a prescribed angle with respect to a pixel train of said display panel extending in a direction substantially perpendicular to said first direction.

* * * * *